(12) United States Patent
Schmidt

(10) Patent No.: US 8,584,343 B2
(45) Date of Patent: Nov. 19, 2013

(54) METHOD FOR THE APPLICATION OF A JOINT OR FUNCTION ELEMENT TO PLANAR MATERIAL RIVET CONNECTION

(76) Inventor: Heiko Schmidt, Lappersdorf (DE)

( * ) Notice: Subject to any disclaimer, the term of this patent is extended or adjusted under 35 U.S.C. 154(b) by 1039 days.

(21) Appl. No.: 12/451,456

(22) PCT Filed: May 9, 2008

(86) PCT No.: PCT/DE2008/000792
§ 371 (c)(1),
(2), (4) Date: Nov. 13, 2009

(87) PCT Pub. No.: WO2008/138315
PCT Pub. Date: Nov. 20, 2008

(65) Prior Publication Data
US 2010/0064500 A1     Mar. 18, 2010

(30) Foreign Application Priority Data

May 14, 2007 (DE) .......................... 10 2007 022 907
Feb. 25, 2008 (DE) .......................... 10 2008 010 868
Apr. 2, 2008 (DE) .......................... 10 2008 017 178

(51) Int. Cl.
*B21J 15/02* (2006.01)
*B21J 15/04* (2006.01)

(52) U.S. Cl.
USPC .............. 29/524.1; 29/525.05; 29/525.06; 29/243.53; 403/282; 403/285

(58) Field of Classification Search
USPC ............ 29/432.1, 432.2, 524.1, 525.06, 798, 29/243.53, 525.05, 243.5; 403/282, 283, 403/285; 411/179, 180, 181; 72/470, 474, 72/476
See application file for complete search history.

(56) References Cited

U.S. PATENT DOCUMENTS

| | | | |
|---|---|---|---|
| 1,579,875 A | 4/1926 | Lundberg | |
| 4,039,099 A * | 8/1977 | Boxall | .......................... 220/773 |
| 5,251,370 A | 10/1993 | Muller et al. | |
| 5,335,411 A | 8/1994 | Muller et al. | |
| 5,502,888 A * | 4/1996 | Takahashi et al. | ............... 29/798 |
| 6,220,804 B1 * | 4/2001 | Pamer et al. | ................... 411/180 |
| 7,155,798 B2 * | 1/2007 | Muller et al. | ................... 29/512 |
| 2005/0022359 A1 | 2/2005 | Muller et al. | |
| 2005/0210651 A1 * | 9/2005 | Vrana et al. | ................. 29/432.1 |

FOREIGN PATENT DOCUMENTS

| | | |
|---|---|---|
| WO | WO 95/26256 | 5/1995 |
| WO | WO 2007/065398 | 6/2007 |

* cited by examiner

*Primary Examiner* — Jermie Cozart
(74) *Attorney, Agent, or Firm* — Welsh Flaxman & Gitler LLC

(57) ABSTRACT

The invention relates to a method for the application of a function or joint element to an elastically deformable planar material or workpiece, the function element having a rivet section on a contact surface, extending beyond said surface, wherein the application of the function element to the planar material is achieved in a jointing and riveting process by introduction of the section into a joint opening and by plastic deformation of the river section in a rivet connection engaging behind the joint opening, wherein, in a boundary region enclosing the joint opening, the planar material is held under tension between the deformed rivet connection and the contact surface of the function element.

16 Claims, 8 Drawing Sheets

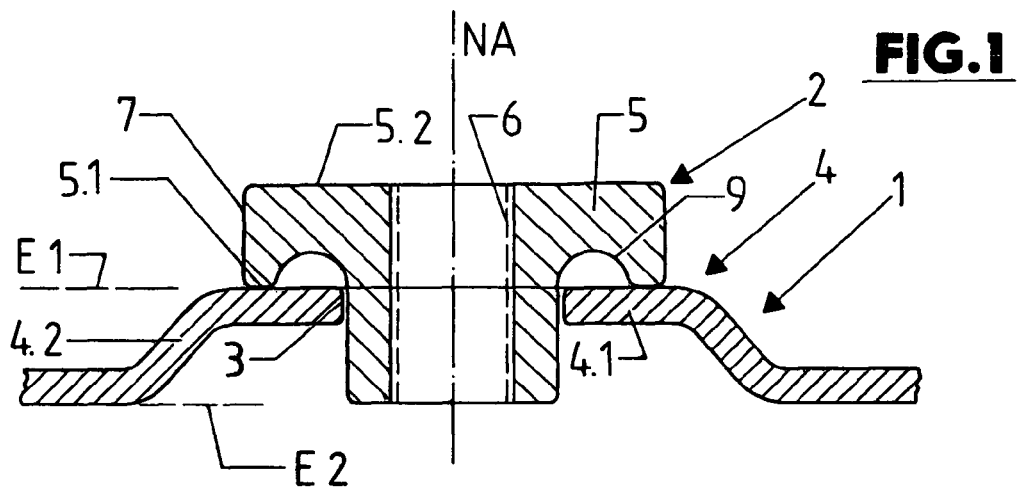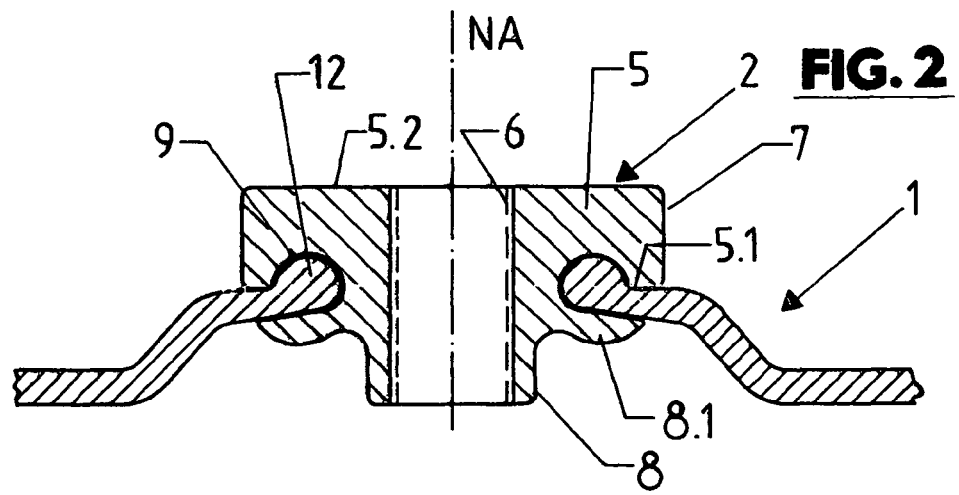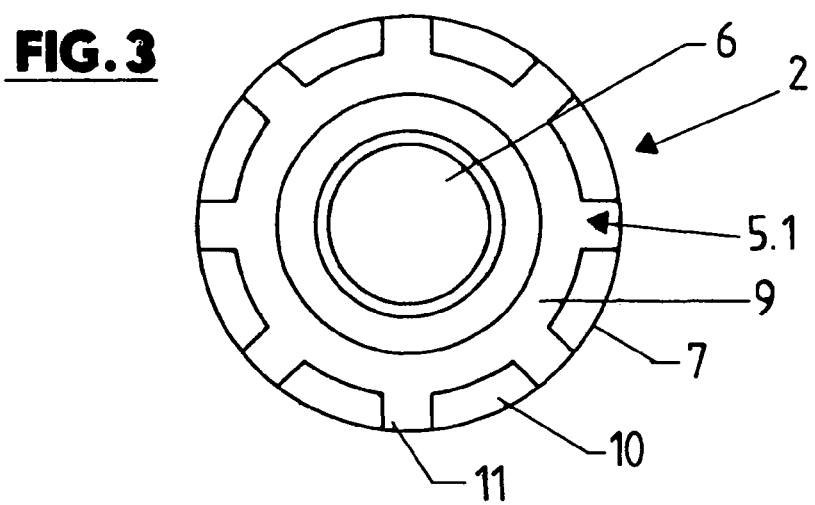

METHOD FOR THE APPLICATION OF A JOINT OR FUNCTION ELEMENT TO PLANAR MATERIAL RIVET CONNECTION

BACKGROUND OF THE INVENTION

The invention relates to a method for attaching a joining element to a deformable flat material or workpiece or to a rivet joint or connection and to a joining or function element for connecting same to a flat material.

Methods for the attaching and/or fixing of function elements, especially of connecting elements, such as nuts, bolts or similar elements to a flat material, for example to a workpiece manufactured from a flat material, are known in various embodiments. In particular, a method is known in which the attachment or fixing of the respective function element takes place by riveting in the area of a dome-shaped section manufactured from the flat material by permanent or plastic deformation, i.e. by drawing or pressing (EP 539 793 B1). In this prior disclosed method, after joining and during riveting of the rivet collar provided on the function element, the dome-shaped section is reshaped so that the diameter of the joining opening in the flat material is reduced and its edge is pressed to produce radial pressure ring tension on the rivet collar, namely for the purpose of additional anchoring. However, this prior method requires a relatively elaborate tool. Further, it has proven that, contrary to expectations, this method does not achieve a substantial improvement in the anchoring, i.e. especially the pull-out strength of the function element in the workpiece or in the flat material.

It is an object of the invention is to present a method that can be implemented with simplified means while nevertheless enabling anchoring of function elements in a flat material with high pull-out strength.

SUMMARY OF THE INVENTION

In an embodiment of the invention, the attachment or fixing of the respective function element to the flat material or to a workpiece made of the flat material takes place in such a manner that the function element is located or inserted in the area of a dome-shaped section or at the base of such a section. Preferably the deformed rivet collar is held or received in the recess formed by the dome-shaped section and therefore does not protrude over a surface side of the workpiece.

Also in an embodiment of the invention, in which the function element is inserted into a joining opening formed in the area of a dome-shaped section or at the base of such a section, the riveting takes place by shear riveting of the rivet section of the function or joining element; in any case, there is no deformation of the dome-shaped section in the manner that the diameter of the joining opening is reduced. The anchoring or fixing of the function element takes place solely by the riveting, i.e. by holding the flat material under tension in the edge area surrounding the joining opening and plastic or flowing deformation of the flat material in the manner that in addition to holding under tension, anchoring between the deformed rivet collar and the opposite face of the joining element is also achieved by narrowing or constriction. The latter is achieved by the fact that between the deformed rivet collar and the opposite bearing surface at least one area of the flat material or workpiece is formed with a reduced material thickness as compared to at least one further area located further inward relative to the axis of the joining opening. The joining then takes place, for example, in that during riveting, within a recess formed on the bearing surface between the rivet section and the periphery of the bearing surface, for example within a ring groove, a ring-shaped bulge is produced from the flat material by flowing of this material, with a thickness that is greater than the thickness of the flat material held under tension between the deformed rivet collar and the bearing surface.

In a preferred embodiment of the invention, the forming of the dome-shaped section accommodating the rivet collar takes place during the joining and riveting process, namely so that in a first process step the joining opening is created by pre-punching, and in a further process step, after the joining or insertion of the rivet section of the function or joining element into the joining opening, the rivet collar is partially formed by pre-forming or pre-stamping so that the pre-formed rivet collar protrudes over the edge of the joining opening, and in a third process step a dome-shaped section is formed in the area of the joining opening and the pre-formed rivet collar, and in a fourth process step the final riveting and forming of the rivet collar takes place by final stamping, i.e. the rivet process initiated with pre-forming of the rivet collar is completed. The above process steps take place consecutively in time, for example. However, individual process steps can overlap at least partially. For example, it is possible that the forming of the dome-shaped section already takes place or is at least started at the end of the pre-forming or pre-stamping of the rivet collar, and/or that the final riveting and forming of the rivet collar takes place during forming of the dome-shaped section or is at least started during the forming of the dome-shaped section.

"Flat material" according to the invention is a flat material made of a permanently deformable material, in particular of a metal material, for example steel, and also refers to workpieces manufactured from such a flat material. "Joining element" or "function element" according to the invention refer generally to elements to be attached in such a flat material or workpiece, in particular also connecting elements, such as nuts, bolts, etc.

BRIEF DESCRIPTION OF THE DRAWINGS

The invention is described below in detail based on exemplary embodiments with reference to the drawings, in which:

FIG. 1 is a simplified depiction of a function or joining element in the form of a nut inserted into an opening of a workpiece;

FIG. 2 is a depiction similar to FIG. 1, however after joining of the function element with the workpiece;

FIG. 3 is a simplified depiction in top view of the bottom side of the joining element in FIG. 1;

DETAILED DESCRIPTION OF THE INVENTION

Figure 4:
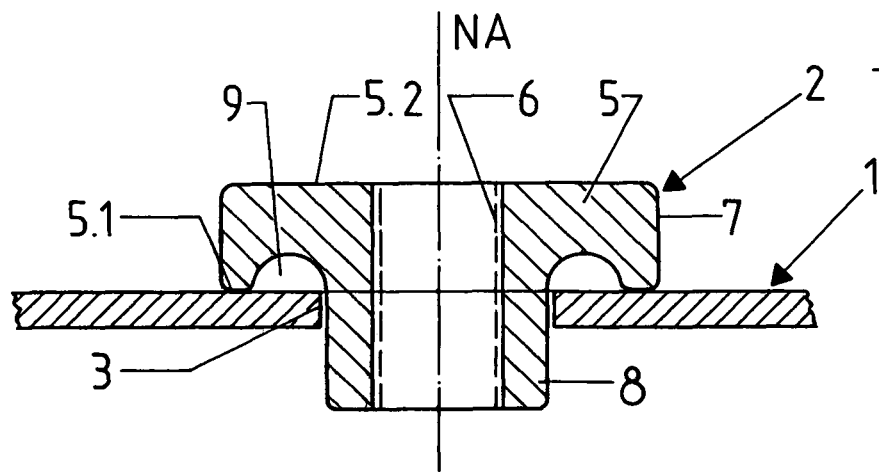
FIGS. 4-6 are depictions similar to FIGS. 1 and 2, however of a further embodiment of the invention.

In FIGS. 1 and 2, 1 is a workpiece manufactured from a metal flat or sheet material, for example sheet steel, in which a connecting or joining element 2 designed as a rivet nut is anchored by joining and shear riveting. The workpiece 1 is provided with a joining opening 3, which is located at the base 4.1 of a dome-shaped section 4, which is manufactured from the flat material of the workpiece 1 by permanent deformation with an edge 4.2 surrounding the base 4.1. The dome-shaped section 4 in the depicted embodiment is designed with a tapered form on its edge 4.2, so that the corresponding taper angle opens toward the base 4.1. With the edge 4.2 the dome-shaped section 4 makes the transition into the workpiece 1 outside of the section 4, namely so that in the depicted embodiment the plane E1 of the base 4.1 is at a distance from the plane E2 of the remaining workpiece 1.

The rivet nut or the joining element 2, which likewise is manufactured from a metal material that can be permanently deformed by shear riveting, for example steel, consists essentially of a rivet nut body 5, which in the depicted embodiment is essentially cylindrical relative to the rivet nut axis NA and comprises a bore hole 6 with nut threads that is open at both ends and oriented on the same axis as the axis NA. One of the two end faces of the body 5 forms an end bearing surface 5.1, on which the joining element 2 bears against the side of the base 4.1 facing away from the plane E2 after riveting or connecting with the workpiece 1. When the joining element 2 has not yet been processed, a rivet section 8, which has a hollow cylindrical form and concentrically encloses the axis NA, namely with a diameter smaller than the outer diameter of the body 5, protrudes over the bearing surface 5.1. The axial length of the rivet section 8 in the depicted embodiment is smaller than the axial length of the body 5 and the distance between the bearing surface 5.1 and the opposing end face 5.2 of the body 5.

Between the rivet section 8 and the outer edge 7 a ring groove 9 is produced in the end face or bearing surface 5.1 and encloses the axis NA in a ring-like manner. The ring groove 9 is at a distance from the outer edge 7, so that between the ring groove 9 and the outer edge 7 a ring surface 10 is formed, on which the bearing surface 5.1 in the depicted embodiment comprises groove-shaped recesses 11, so that a profiling consisting of the recesses 11 and the protrusions formed in between said recesses is formed on the ring surface 10 for transfer of the torque between the workpiece and the joining element 2 anchored in the workpiece. In the depicted embodiment the recesses 11 extend into the ring groove 9 and reach all the way to the outer edge 7. Of course, other embodiments of a profiling on the bearing surface 5.1 are also possible, for example in the form of stays bridging the ring groove 9.

For connecting or fixing the joining element 2 with or on the workpiece 1 the joining element is inserted with the rivet section 8 front first into the joining opening 3, namely so that the rivet section 8 extends with its ends at a distance from the body 5 into the interior of the dome-shaped section 4 and the bearing surface 5.1 bears against the side of the base 5.1 facing away from the plane E2. The joining opening 3, which for example was produced in the workpiece 1 or sheet metal after forming of the dome-shaped section 4 or was produced in the workpiece 1 during forming of the dome-shaped section 4, has a diameter that is equal to, but preferably slightly larger than the outer diameter of the rivet section 8. After insertion of the rivet section 8 into the joining opening 3, the joining element 2 is anchored in the workpiece 1 by means of shear riveting. During this shear riveting, not only is a rivet collar 8.1 bearing against the inner side of the base 4.1 produced by shearing and plastic deformation of the rivet section 8 in an edge area, but at the same time the material of the workpiece 1 in the area of the joining opening 3 is deformed permanently or plastically also by partial flowing of this material so that a ring-shaped bulge 12 with an enlarged material thickness forms, surrounding the joining opening 3 and accommodated in the ring groove 9 and also protruding somewhat over the plane of the top side of the base 4, in particular also with a material thickness that is greater than the distance between the deformed rivet collar 8.1 and the opposing ring surface 10, so that the bulge 12 formed within the ring groove 9 and held under tension between the deformed rivet collar 8.1 and the opposing ring surface 10 results in a high pull-out strength for the joining element 2 anchored in the workpiece, and not only due to the connection in the area of the bulge 12, but also due to the additional reinforcement of the edge area of the joining opening 3 produced by the bulge 12.

After shear riveting, the section 8 with a reduced diameter continues to be accommodated in the interior of the dome-shaped section 4, namely so that neither the remaining rivet section 8 nor the rivet collar 8.1 formed by shear riveting protrudes over the bottom side of the workpiece 1.

Figure 5:
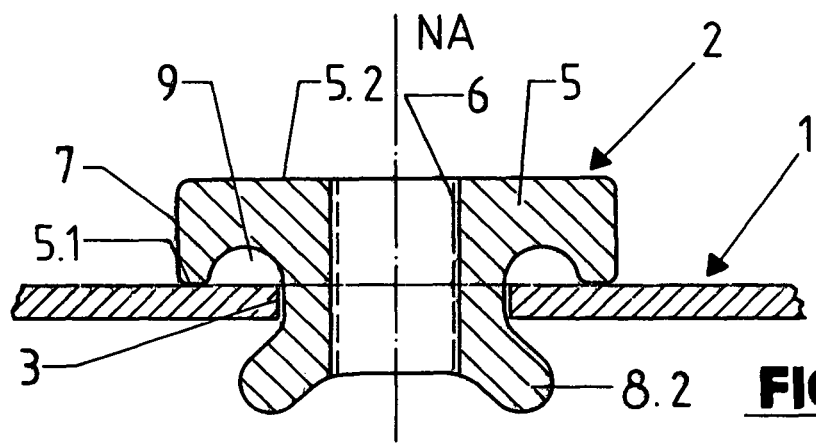
Figure 6:
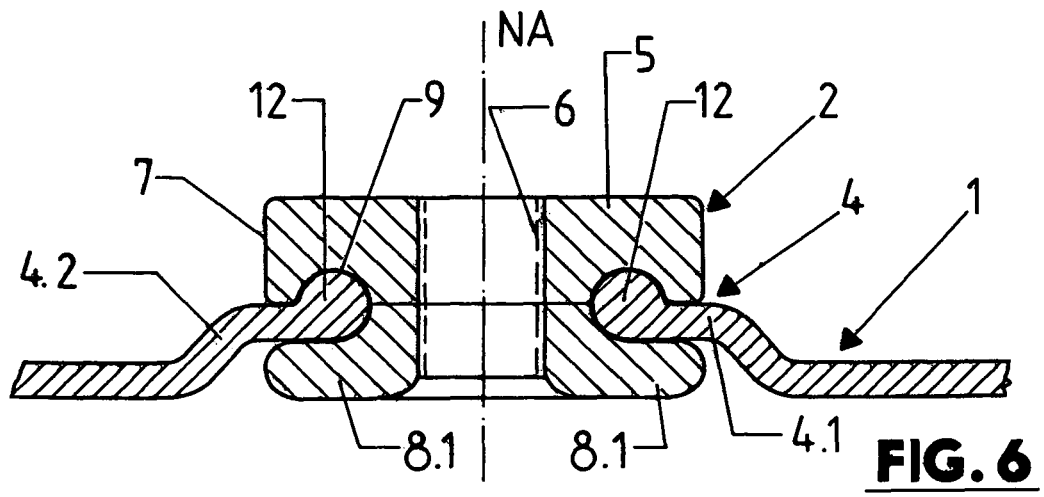

FIGS. 4-6 show a method in which the dome-shaped section 4 is not produced until after the insertion of the joining element 2 into the joining opening 3 and during the riveting process, however likewise in the manner that during riveting the bulge 12 surrounding the joining opening 3 and accommodated in the ring groove 9 and held under tension on the periphery or edge of the joining element 2 or of the joining element body 5 is formed between the deformed rivet collar 8.1 and the opposing ring surface 10.

Figure 7:
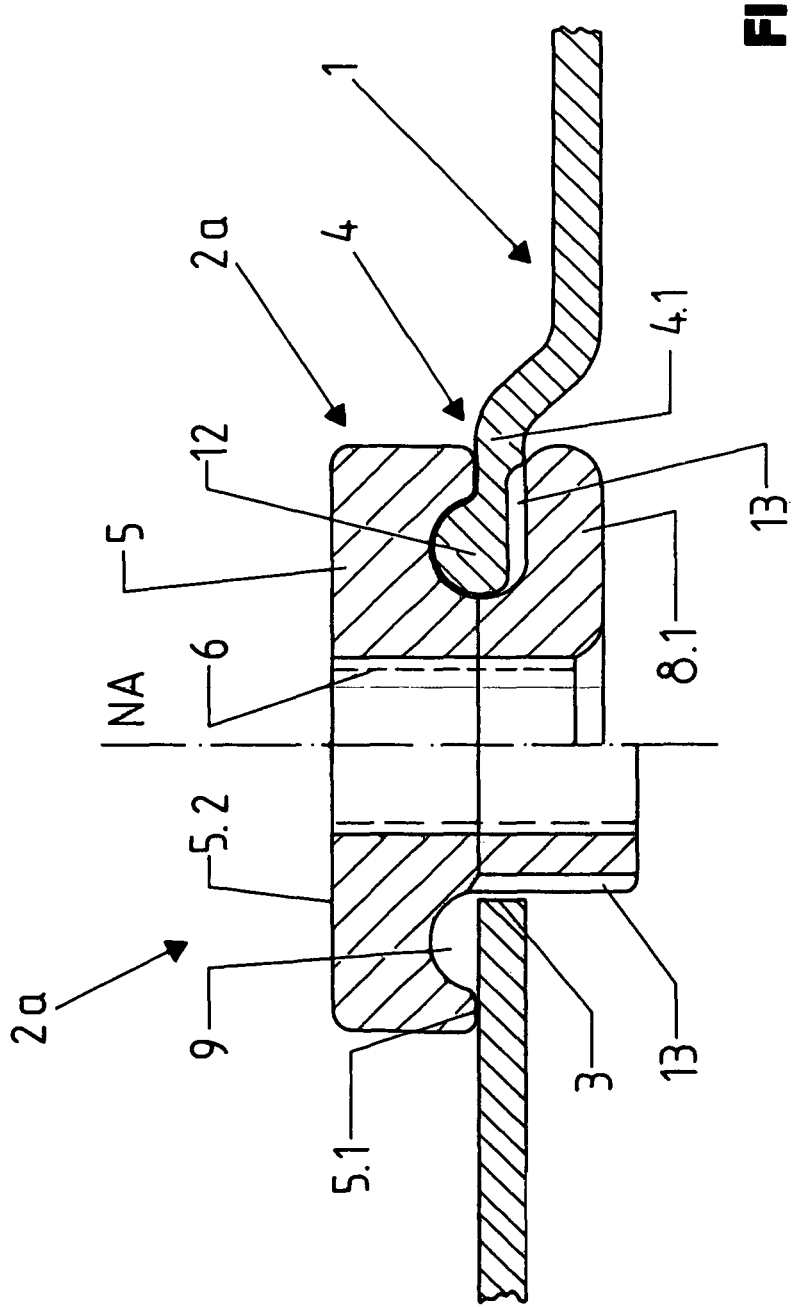
FIG. 7 is a depiction similar to FIGS. 4 and 6 of a further embodiment.

In this method depicted in FIGS. 4-6, after insertion of the joining element 2 into the joining opening 3, first the forming of a pre-formed rivet collar 8.2 from the rivet section 8 (FIG. 5) takes place in the still flat workpiece 1. In a following step a dome-shaped section corresponding to the dome-shaped section 4 is then produced. The joining and riveting process is concluded with the final riveting or with the final forming of the rivet collar 8.1. During this process it is also possible to have the forming of the dome-shaped section and the final riveting take place in a process step, e.g. temporally staggered or at least partially overlapping temporally. Further, it is also possible to have the forming of the pre-formed rivet collar 8.2 and the forming of the dome-shaped section 4 take place at least partially overlapping temporally. FIG. 7 shows at the left a joining element 2a before and at the right after joining with the workpiece 1. The joining element 2a differs from the joining element 2 in that it is profiled on the outer surface of the section 8 at 13, i.e. it is provided for example with ribs or protrusions extending parallel to the axis NA, which (ribs or protrusions) after final riveting are pressed into the material of the workpiece 1, in particular also in the area of the rivet collar 8.1 and therefore very effectively securing the riveted joining element 2a against twisting. For further improvement of the torque absorption or securing against twisting of the joining element 2 or 2a anchored in the workpiece 1, it is further possible to profile the ring groove 9, for example by stays extending crosswise to said ring groove or by interruptions in the ring groove and/or to design the ring groove 9 so that it has a non-circular form, for example a polygonal form on at least one edge, for example on the inner or outer edge, or on both edges.

Figure 8:
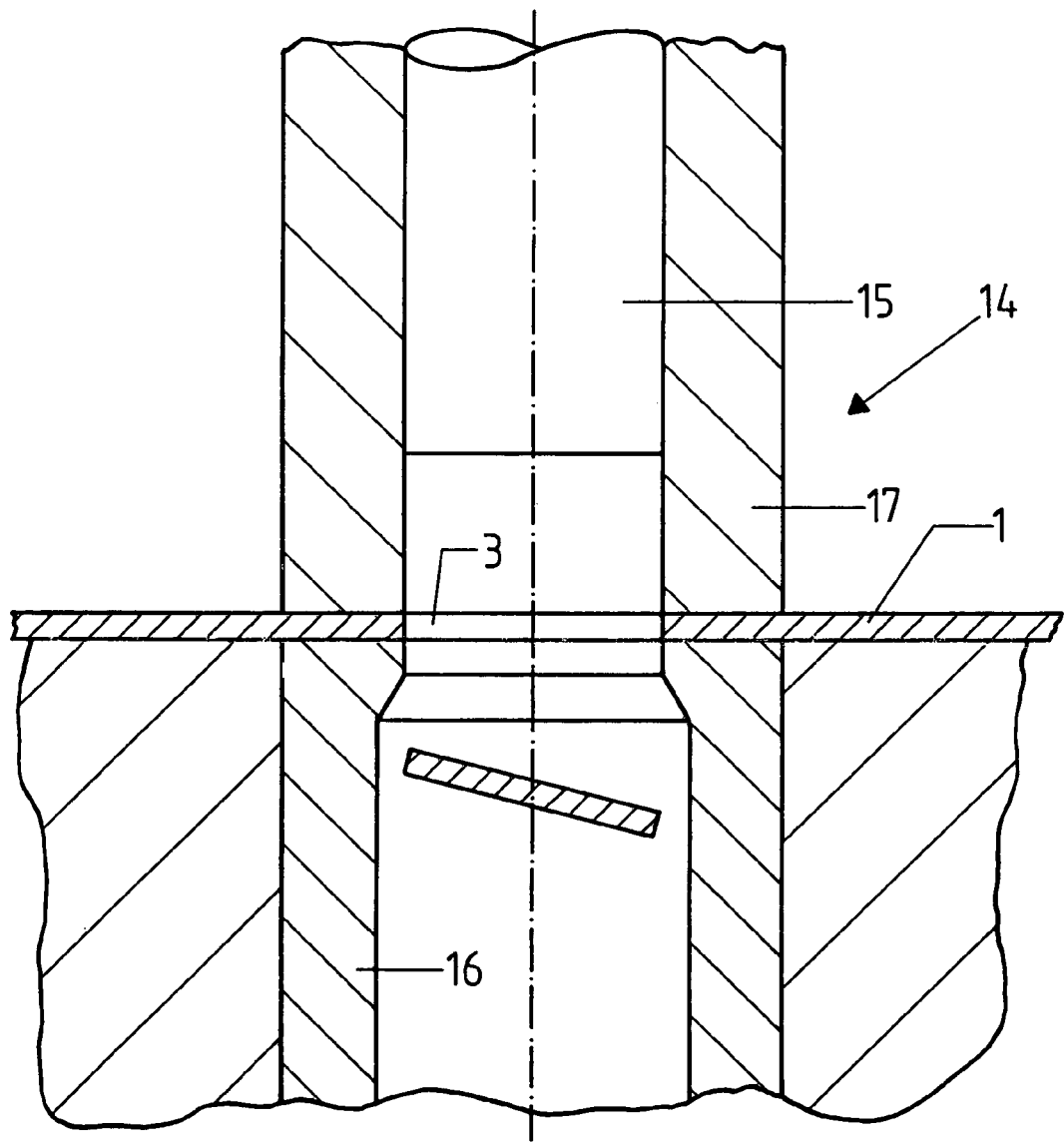
FIGS. 8-12 are depictions similar to FIGS. 4-6 showing the process steps in a further method according to the invention.
Figure 9:
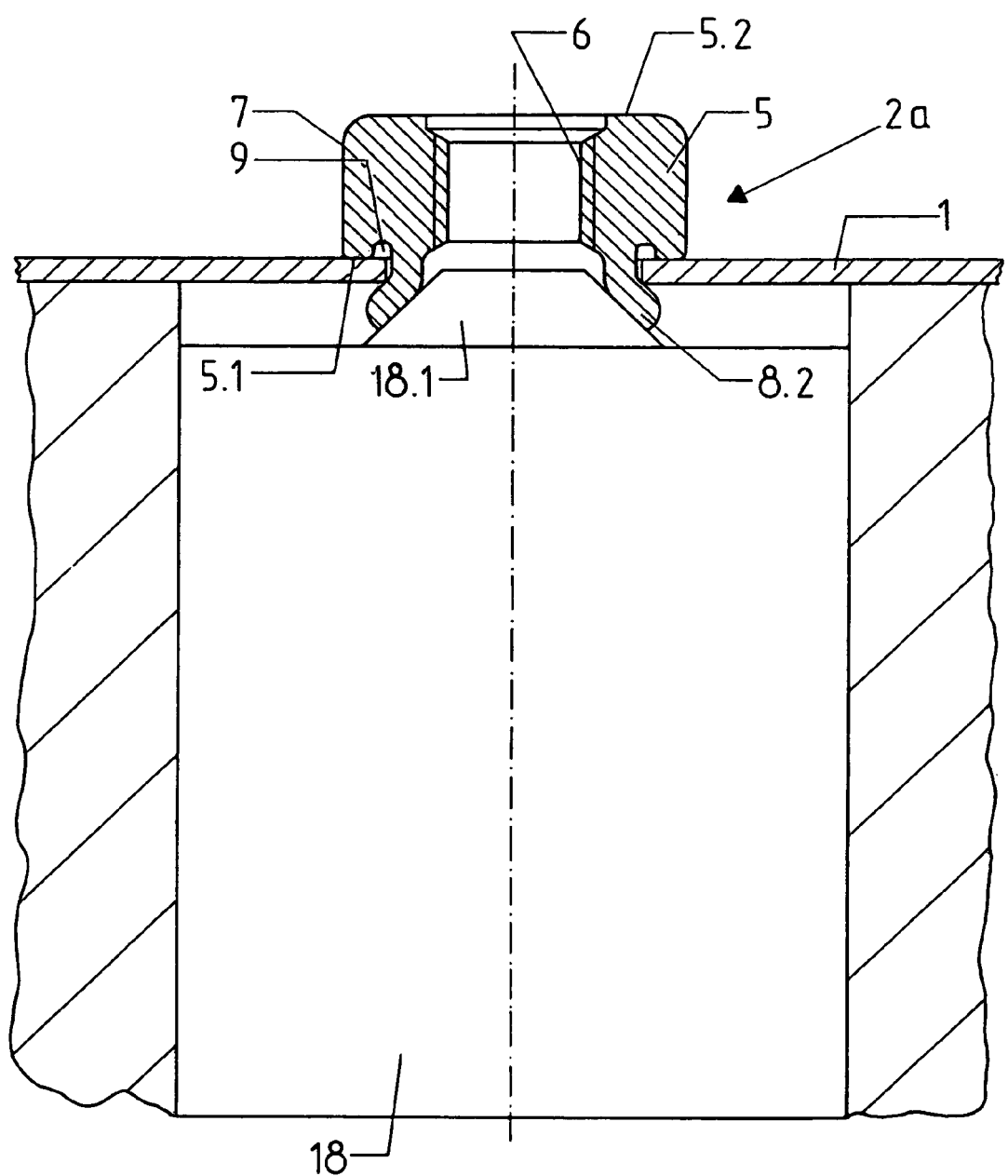

FIGS. 8-12 show the various process steps of a further embodiment of the method according to the invention for attaching the function or joining element 2a designed as a rivet nut in the workpiece 1 made of flat material (sheet steel). FIG. 8 shows a simplified depiction of the production of the joining opening 3 in the workpiece 3 by means of a punching tool 14, which consists essentially of a shearing or stamping punch 15, a press-plate 16 and a blank holder 17 surrounding the punch 15 in a sleeve-like manner, with which the workpiece 1 is pressed against the press-plate 16.

After producing the joining opening 3 the joining element 2a with its not yet formed rivet collar or section 8 is inserted into the joining opening 3, so that the edge of the joining opening bears against the bearing or end face 5.1 of the joining element body 5 and the section 8 protrudes over the bottom side of the workpiece 1. In a subsequent process step corresponding to FIG. 9, partial forming of the section 8 to form the pre-formed rivet collar 8.2 takes place using a punch-like tool 18, which acts with a cone-shaped section 18.1 on the rivet section 8, so that the pre-formed rivet collar 8.2 has a diameter on its lower edge that is already significantly greater than the diameter of the joining opening 3. After forming of the pre-formed rivet collar 8.2 in the area of the joining opening 3, the workpiece 1 is still flat or essentially flat.

Figure 10:
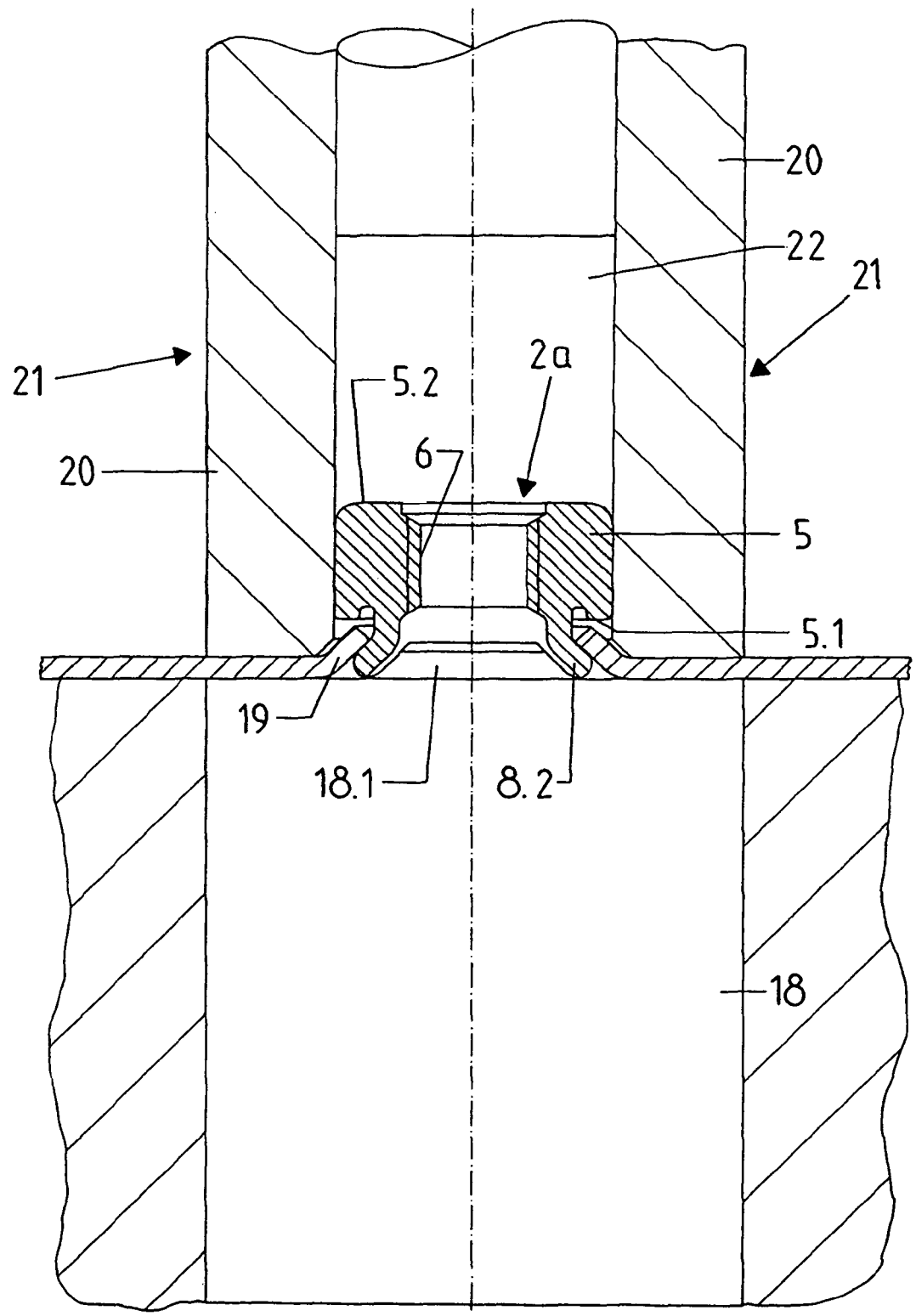
Figure 11:
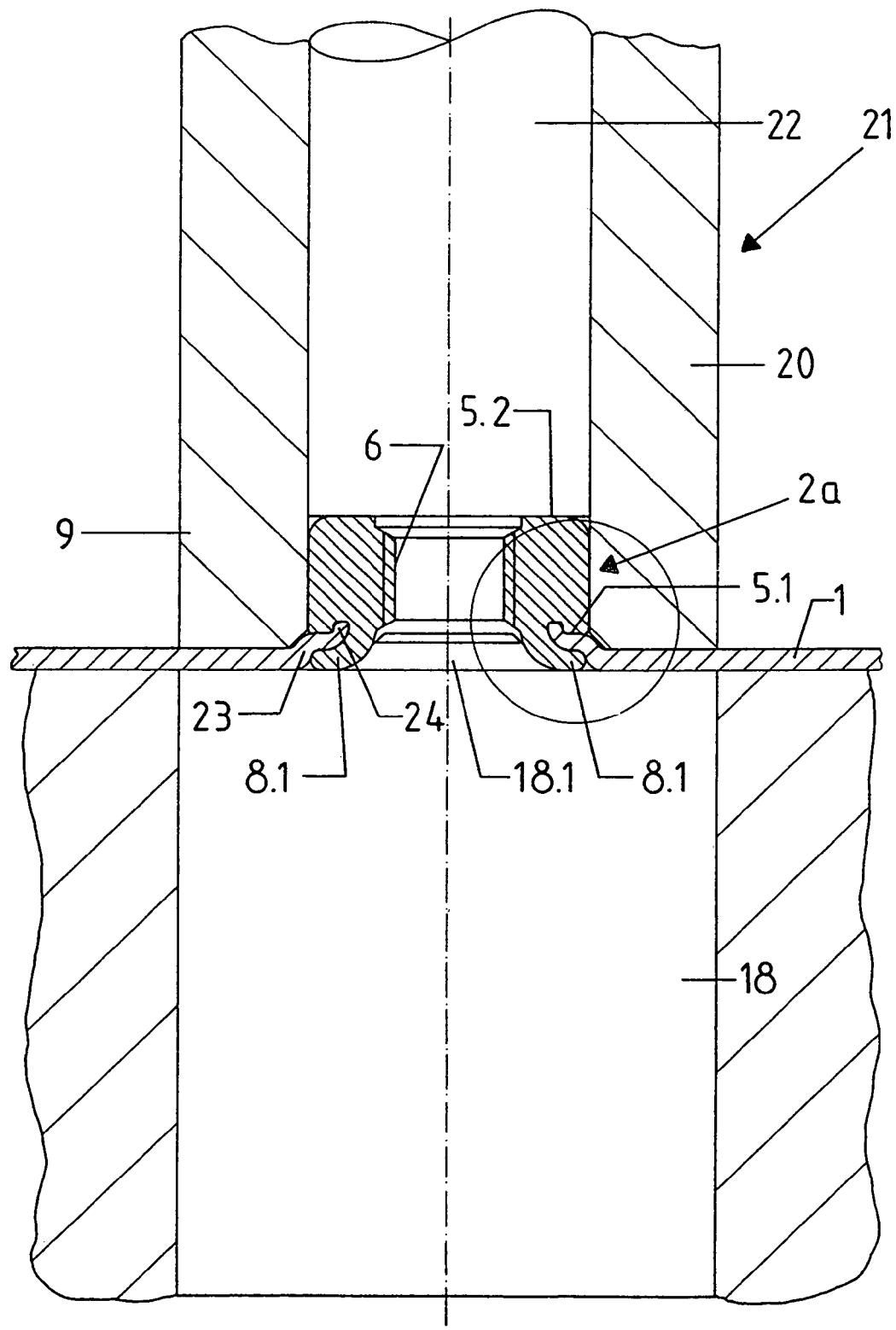
Figure 12:
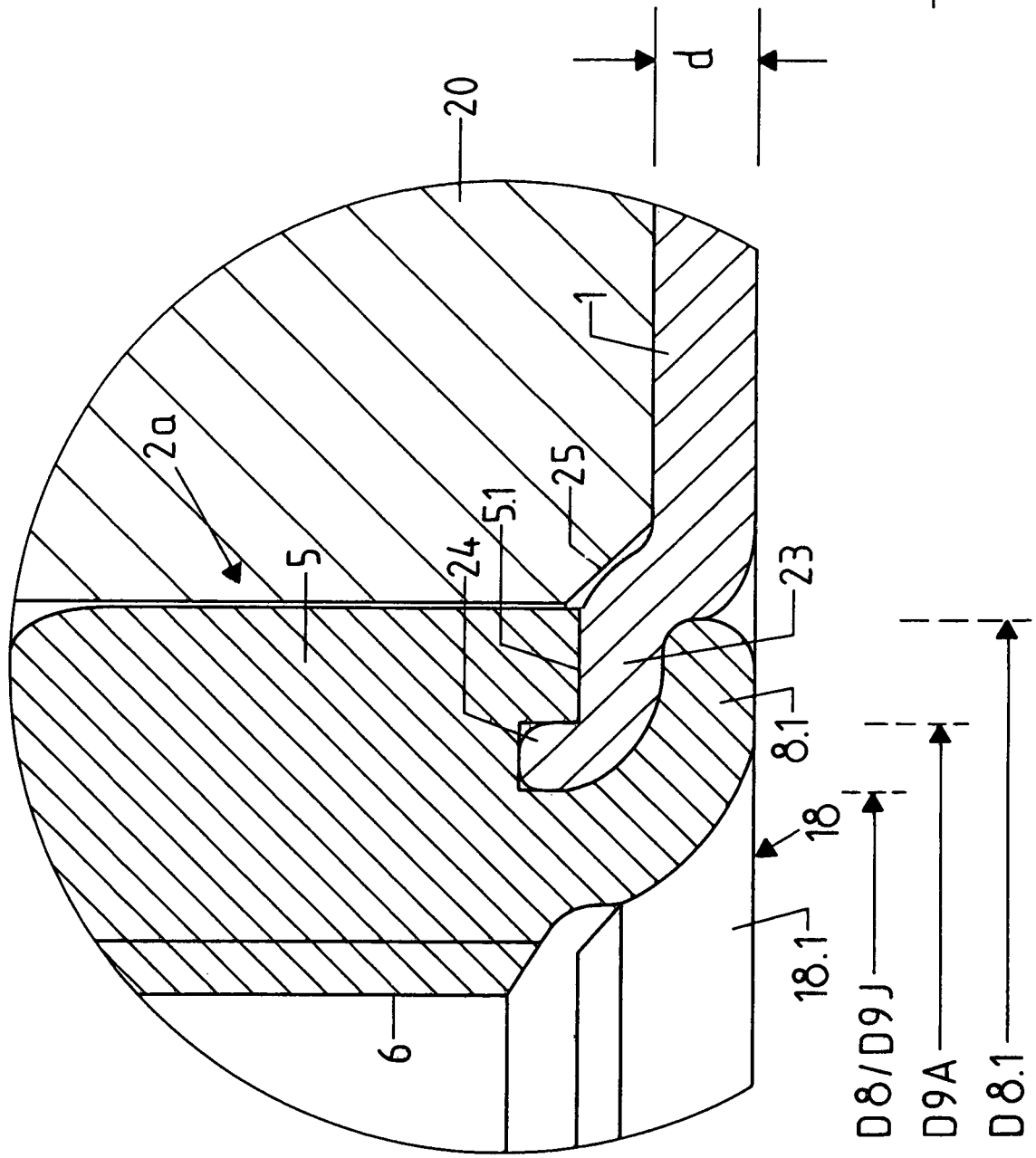

In a subsequent process step according to FIG. 10, filling of the workpiece in the edge area of the joining opening 3 takes place, i.e. the workpiece 1 is deformed in the edge area of the joining opening 3 by enlarging the joining opening 3 to produce a conical ring-shaped edge area 19, which protrudes over the top side of the workpiece 1 facing the joining element body 5. This conical ring-shaped edge area 19 is formed by the workpiece 1 being supported on its top side in a ring-shaped area surrounding the joining element body 5 by means of a tool part 20, in the form of a press-plate or blank holder, which is part of a three-part tool 21 and the joining element is supported on its top end face 5.2 facing away from the workpiece 1 by a punch 22 of this tool 21 and also that the lower tool part 18 of this tool 21 is moved toward the punch 22 or the tool part 20. The forming of the conical ring-shaped edge area 19 takes place by the pre-formed rivet collar 8.2 being supported against the section 18.1.

Especially through corresponding embodiment of the tool section 18.1, the rivet section 8 is formed to produce the pre-formed rivet collar 8.2 so that the pre-formed rivet section 8.2 continues to be ring-shaped or essentially ring-shaped in a sub-section directly adjoining the joining element body 5 and is formed to be conically ring-shaped only in an adjacent sub-section, with a cross section that enlarges downward. The forming of the conical ring-shaped edge area 19 is completed as soon as the punch-like tool part 18 bears with its upper tool surface surrounding the section 18.1 in a ring-like manner against the bottom side of the workpiece 1 and the latter is therefore firmly held under tension between the tool part 18 and the tool part 20 in an edge area surrounding the joining element body 5. As FIG. 10 shows, in this state the edge area 19 is formed so that the edge of the joining opening 3, which has a somewhat enlarged diameter as compared with the original diameter, is at a distance both from the end face 5.1 and from the peripheral surface of the non-deformed area of the rivet section 8.

In a further process step the final riveting or forming of the final rivet collar 8.1 takes place, namely in that with the workpiece 1 still being supported against the tool part 18 and being held under tension between said tool part and the tool part 20, the punch 22 is moved toward the tool part 18, causing deformation of the pre-formed rivet collar 8.2 to produce the final rivet collar 8.1 and also a permanent or plastic deformation of the material of the workpiece 1 in the edge area of the joining opening 3, so that the material of the workpiece 1 in the edge area of the joining opening 3 on the one hand is held under tension between the rivet collar 8.1 formed on the bottom side of the workpiece 1 and the bearing or ring-shaped end face opposing said rivet collar, and on the other hand is formed in the direct area of the edge of the joining opening 3 by flowing to produce the ring groove 9, which is provided on the bearing and end face 5.1 of the joining element 2a. The workpiece 1 therefore, on the edge area of the original joining opening 3, which is accommodated at least partially in the riveted joining element 2a, forms an approximately dome-shaped section 23 protruding over the plane of the top side of the workpiece 1, which (section) on the inside and on its top side facing away from the bottom side of the workpiece 1 is designed with a protruding ring-shaped or cylindrical section 24 accommodated in the ring groove 9. The section 24 accommodated in the ring groove 9 and the area of the dome-shaped section 23 held under tension between the end face 5.1 and the rivet collar 8.1 result in the desired high-strength connection between the joining element 2a and the workpiece 1. Since the final forming of the rivet collar 8.1 takes place in particular also with the cooperation of the flat end face of the tool part 18 surrounding the tool section 18.1, the deformed rivet collar 8.1 does not protrude over the bottom side of the workpiece 1, but rather is on a plane with said bottom side.

To deform the edge area surrounding the joining opening 3 to produce the dome-shaped section 23, the tool part 20 is conically beveled on its inner edge area at 20.1.

In order to achieve, after final riveting, a deformed rivet collar 8.1 with an outer diameter D8.1 that is equal to or approximately equal to the outer diameter of the joining element body 5, and to further achieve that between this finally formed rivet collar 8.1 and the opposing bearing or end face 5.1 of the joining element 2 or 2a or of the joining element body 5, the dome-shaped section 23 surrounding the joining opening is firmly held under tension and at the same time the ring-shaped section 24 is also formed in the ring groove 9, the joining element 2 or 2a is designed as follows:

The joining element 2 or 2a comprises in the area of the joining section 8 a formed in the manner that the outer diameter of the ring groove 9, i.e. the diameter D9A of the outer edge of the ring groove 9 is greater or at least equal to the diameter D8.1 of the formed rivet collar 8.1, namely plus the thickness d (sheet metal thickness) of the workpiece 1 or, for example, plus twice the thickness d.

Further, the diameter D8 of the non-formed rivet collar or section 8 is smaller or equal to the inner diameter of the ring groove 9, i.e. the diameter D9I of the inner edge of the ring groove 9, but in any case smaller than the diameter D9A of said ring groove. The invention was described above based on exemplary embodiments. It goes without saying that numerous modifications and variations are possible, without abandoning the underlying inventive idea on which the invention is based.

For example it was assumed above in connection with FIGS. 4-6 that the rivet section 8 is completely deformed to produce the rivet collar 8.1. Of course, shear riveting can also be used for this embodiment.

It was further assumed above in connection with FIGS. 8-12 that the lower tool part 18 is movable. In practice, this tool part is fixed. The moving parts both during the forming of the pre-formed rivet collar 8.2 and during the final riveting or forming of the final rivet collar 8.1 are the tool parts 20 and 22 and the tool part 16.1 surrounding the tool part 18 together with the flat material 1.

It was further assumed above that the joining element 2 is a rivet nut. Of course, other embodiments of the joining element are conceivable, for example in the form of another type of connecting element, such as a bolt, for example, also a threaded bolt, etc.

In connection with FIG. 7 the use of the joining element 2a with the profiling 13 was presented in a method in which the section 8 is completely deformed to produce the rivet collar 8.1. Of course, the joining element can also be used in a method in which the rivet collar is produced by shear riveting.

In this embodiment the joining element 2a can likewise be provided in addition to the ring groove with the recesses 11 and/or profiling 13 for improving the torsional strength or the torque absorption. It is further possible in this embodiment to design the ring groove 9 so that it is interrupted singly or multiply by stays extending radially to the axis NA of the joining element 2a.

REFERENCE LIST 1 workpiece
2, 2a joining element
3 joining opening
4 dome-shaped section
4.1 base
4.3 edge area
5 joining element body
5.1 bearing or end face
5.2 end face
6 threaded hole
7 peripheral surface or edge
8 section
8.1 rivet collar
8.2 pre-formed rivet collar
9 ring groove
10 ring surface
11 recess
12 bulge
13 profiling
14 punching tool
15 punch or shearing punch
16 die-plate
16.1 tool part
17 blank holder
18 tool part
18.1 cone-shaped tool section
19 divided edge area
20 tool part
21 tool
22 punch
23 dome-shaped section
24 ring-shaped section
25 bevel
d thickness of the workpiece
D8 diameter of section 8
D8.1 diameter of the pre-formed rivet collar 8.1
D9A outer diameter of ring groove 9
D9I inner diameter of ring groove 9
E1, E2 plane
NA axis of the joining element

What is claimed is:

1. A method for attaching a joining element to a deformable flat material, the joining element comprises on a bearing surface of a joining element body, a rivet section protruding over said bearing surface, wherein an attachment of the joining element on the deformable flat material takes place in a joining and riveting process by insertion of the rivet section into a joining opening and by permanent deformation of the rivet section to form a rivet collar engaging behind the joining opening so that the deformable flat material is held under tension in an edge area surrounding the joining opening between the rivet collar and the bearing surface of the joining element, wherein during the riveting process a dome-shaped section forming a recess for accommodating or receiving the rivet collar is produced, wherein the riveting process is performed by use of a tool having on one side of the deformable flat material an axially movable punch-shaped first tool part with a cone-shaped section on a face and having on an other side of the deformable flat material an axially movable punch enclosed by a die-shaped second tool part receiving the joining element with the joining element body during the riveting process, the method further comprising:

inserting the rivet section into the joining opening and transforming the rivet collar with the cone-shaped section of the first tool part into a pre-formed rivet collar and keeping the deformable flat material flat in an area of the joining opening, pre-forming the dome-shaped section by deformation of the deformable flat material in an edge area surrounding the joining opening after forming of the pre-formed rivet collar, by the pre-formed rivet collar bearing against the cone-shaped section of the first tool part, and final riveting of the joining element on the deformable flat material using the tool, the deformable flat material is clamped between the first tool part and the second tool part, such that the deformable flat material in the edge area of the joining opening is clamped between the rivet collar and the bearing surface, wherein for pre-forming the dome-shaped section, the joining element bearing against the punch is axially moved relative to the deformable flat material with the pre-formed rivet collar bearing against the cone-shaped section of the first tool part, and wherein for the final riveting of the joining element, the punch bearing against the joining element body is moved toward the first tool part, causing the deformation of the pre-formed rivet collar to form the final rivet collar.

2. The method according to claim 1, wherein the partial forming of the pre-formed rivet collar takes place so that the pre-formed rivet collar protrudes over the edge of the joining opening.

3. The method according to claim 1, wherein the process steps take place consecutively in time.

4. The method according to claim 1, wherein the joining process and the riveting process take place at least partially at the same time.

5. The method according to claim 4, wherein the forming of the dome-shaped section already takes place or is at least started at the an end of the pre-forming or pre-stamping of the rivet collar or that the final riveting and forming of the rivet collar takes place during forming of the dome-shaped section or is at least started during the forming of the dome-shaped section.

6. The method according to claim 1, wherein the rivet collar is produced by forming of the entire or essentially entire rivet section.

7. The method according to claim 1, wherein the rivet collar is produced by shear riveting.

8. The method according to claim 1, wherein for pre-forming the dome-shaped section, the joining element bears against the punch and is moved by the first tool part moving toward the die-shaped second tool part in the second tool part and relative to the die-shaped second tool part.

9. A method for attaching a joining element to a deformable flat material, in which the joining element comprises on a bearing surface a rivet section protruding over said bearing surface, the method comprises the steps of:

attaching of the joining element to the deformable flat material takes place in a joining and riveting process by insertion of the rivet section into a joining opening and by plastic deformation of the rivet section to form a rivet collar engaging behind the joining opening so that the deformable flat material is held under tension in an edge area surrounding the joining opening between the rivet collar and the bearing surface of the joining element, and forming a holding area, which as compared to at least one area nearer an axis of the joining opening and located between the bearing surface and the deformed rivet collar has a reduced material thickness, wherein the deformed rivet collar is formed from the rivet section of the function element by shear riveting through shearing and plastic deformation of the rivet section in the edge area so that there is no deformation of a dome-shaped section and a diameter of the joining opening is not reduced.

10. The method according to claim 9, wherein the dome-shaped section accommodating the deformed rivet collar is produced during the shear riveting.

11. The method according to claim 10, wherein the shear riveting takes place in at least two steps, as follows: in a first step, at least pre-stamping takes place by partial forming of the rivet collar, and that in a further process step, a fully formed rivet collar is produced by final stamping and at the same time the deformable flat material is deformed in the area of the joining opening to form the dome-shaped section.

12. The method according to claim 9, wherein the joining element is a rivet nut.

13. The method according to claim 9, wherein the joining element is profiled on the outer surface of the rivet section.

14. The method according to claim 9, wherein after forming of the pre-formed rivet collar the flat material is formed with a tapering or with a conical or essentially conical ring edge area surrounding the joining opening, at least with the cooperation of the pre-formed rivet collar supported against a tool or tool part.

15. The method according to claim 14, wherein during the riveting process or during forming of the rivet collar the tapering or conical ring edge area is deformed to form a dome-shaped section which is held under tension or clamped between the rivet collar and an opposing surface of the joining element, and also an inner ring-shaped section extending away from the dome-shaped section in the direction of the axis of the joining opening or of the joining element.

16. The method according to claim 15, wherein at least the forming of the tapering or conical ring edge area and the riveting process take place in the same tool.

\* \* \* \* \*